United States Patent Office 2,987,377
Patented June 6, 1961

2,987,377
PRODUCTION OF DECABORANE
John P. Faust, Kenmore, and Neil C. Goodspeed, Grand Island, N.Y., assignors, by mesne assignments, to Olin Mathieson Chemical Corporation, a corporation of Virginia
No Drawing. Filed Oct. 1, 1956, Ser. No. 613,353
2 Claims. (Cl. 23—204)

This invention relates to the preparation of decaborane and, more in particular, provides a method for the production of decaborane by the co-pyrolysis of tetraborane and pentaborane (9) under pressure.

Decaborane is a stable, white, crystalline material with a melting point of 99.5° C. Its boiling point is 213° C. at atmospheric pressure and its density is 0.94 g. per cc. at 25° C. The vapor pressure of this compound is 19.0 mm. of mercury at 100° C. Decaborane is a boron hydride of very high boron content and has a very high heat of combustion indicating its utility as a high energy fuel. It is an exteremely valuable material for the preparation of liquid fuels. Methods for the preparation and utilization of such liquid fuels are described in Atlwicker, Garrett, Harris and Weilmuenster application Serial No. 497,407, filed March 28, 1955.

Processes for the production of decaborane from diborane have been proposed. In the majority of these processes, it has been proposed to produce decaborane by the thermal treatment, or pyrolysis, of diborane at substantially atmospheric pressure. The conversion of diborane to decaborane at moderately elevated temperatures, at which temperatures most of the volatile boranes will undergo polymerization to form boranes of higher molecular weight than decaborane, appears to be quite complex and the reaction mechanisms still are not completely understood. In carrying out a process for the production of decaborane involving the pyrolysis of diborane at moderate temperatures, a complete range of boron hydrides, including the higher molecular weight solid products, is produced. A major disadvantage of the processes proposed previously is that the production of high molecular weight solid boron hydrides, which invariably accompany the formation of decaborane in such processes, represents a loss of valuable diborane from the process and a consequent reduction in yield of the desired decaborane. These solid products are extremely inert, and at the present state of the art there is no good method for converting them into useful materials. Another important disadvantage of the pyrolysis processes for the production of decaborane from diborane is that a number of boron hydrides are produced and the conversion to the desired decaborane is extremely small.

There is a need therefore for a process to produce decaborane which greatly reduces the formation of these undesirable solid products with the consequent reduction in yield, and which gives high conversion of the starting boron hydrides to the desired decaborane.

By the process of this invention, tetraborane, which can be conveniently produced in the manner described in Faust and Roscoe application Serial Number 553,427, filed December 16, 1955, and pentaborane (9), prepared in the well known manner, can be converted to decaborane by co-pyrolysis of the tetraborane and pentaborane (9) at moderate temperatures and pressures to give high yields of decaborane. With this process, the production of undesirable solid hydrides of high molecular weight is almost completely avoided.

The following examples illustrate various embodiments falling within the scope of this invention and are to be considered as not limiting.

EXAMPLE I

In this experiment, a stainless steel miniature autoclave obtained from the American Instrument Company was used. This reactor, which had an inside diameter of $5/16$ inch and an outside diameter of $9/16$ inch, was approximately 10 inches long and had a volume of about 8 to 10 ml. A 15,000 p.s.i. American Instrument Company steel gauge was attached to the head of the autoclave and was used to measure the pressure.

In this experiment, 1.07 g. of pentaborane (9), measured by expanding in a calibrated vacuum line, was condensed into the reactor which had previously been cooled to −196° C. by means of liquid nitrogen. Then 1.02 g. of tetraborane, measured by expanding in a calibrated vacuum line, was also condensed into the reactor at −196° C. The reactor containing pentaborane (9) and tetraborane was permitted to warm to room temperature, then nitrogen was pressured into the autoclave until a pressure of 1,300 p.s.i.g. was reached. The reactor was then heated to about 65° C. for one hour by placing a bath of boiling methanol around the reactor. During the reaction period, the maximum pressure developed was 3,150 p.s.i.g. At the end of the reaction period, the reactor was cooled with liquid nitrogen, attached to a vacuum line and the hydrogen formed during the reaction was pumped off.

In the next step, the reactor was allowed to warm to room temperature and the volatile products from the reactor were trapped in a bath cooled to −196° C. by liquid nitrogen. The volatile products were then fractionated through a series of three traps maintained at −78° C., −130° C. and −196° C. respectively. Pentaborane (9) with a trace of tetraborane was retained in the −78° C. trap. The remainder of the unreacted tetraborane was trapped in the −130° C. trap with a trace of pentaborane, while the diborane produced in the reaction was collected in the trap maintained at −196° C. All of the volatile samples were expanded into measured volumes, and samples of the gases so produced were analyzed by infrared methods. In this example, 0.23 g. of tetraborane was recovered along with 0.31 g. of diborane and 0.90 g. of pentaborane (9). No pentaborane (11) was obtained. The reactor was opened in an inert atmosphere and the solids which had formed during the reaction were extracted with 35 ml. of methylcyclohexane. Infrared analysis of the liquid indicated that 0.59 g. of decaborane had been produced. Solids and other losses amounted to 0.08 g. in this experiment. The conversion of pentaborane (9) and tetraborane in this experiment was 46 percent and the yield of decaborane was 60 percent based on the tetraborane and pentaborane (9) converted.

Decaborane of high purity can be conveniently recovered from the decaborane-methylcyclohexane solution by first removing the solvent, methylcyclohexane, by vacuum evaporation followed by recovery of pure decaborane by sublimation from the resulting solids.

EXAMPLE II

In this example, which was performed in the same autoclave as described in Example I, 1.54 g. of tetraborane and 0.54 g. of pentaborane (9), measured by expanding the gas into a calibrated volume, were condensed in the autoclave which had previously been cooled to −196° C. Then the reactor was permitted to warm to room temperature. No nitrogen was added. The co-pyrolysis of tetraborane and pentaborane (9) was conducted for one hour at a temperature of 65° C., the maximum pressure attained being 2,150 p.s.i.g. At the conclusion of the reaction period, the autoclave was cooled and the volatile products were fractionated, measured and analyzed in the same manner as described in Example I.

In this example, 0.46 g. of tetraborane and 0.53 g. of unreacted pentaborane (9) were recovered. In addition, 0.4 g. of diborane and a trace of pentaborane (11) were also obtained. The solid reaction products were recovered and analyzed in the same manner as described in Example I. The yield of decaborane was 0.48 g. and the amount of solids and other losses was 0.21 g. In this experiment, the conversion of pentaborane (9) and tetraborane was 52.4 percent. The yield of decaborane, based on the conversion of tetraborane and pentaborane (9), was 44.1 percent.

A number of additional experiments performed in a similar manner and utilizing the same apparatus are summarized in Table I.

*Table I*

| Example Number | III | IV | V | VI | VII |
|---|---|---|---|---|---|
| Reactants: | | | | | |
| $B_5H_9$, gm | 1.13 | 0.53 | 0.95 | 0.55 | 1.56 |
| $B_4H_{10}$, gm | 1.03 | 1.5 | 1.26 | 1.39 | 0.64 |
| Initial $N_2$ Pressure (p.s.i.g.) | 1,200 | 1,000 | 1,000 | None | 1,000 |
| Reactor Temperature (° C.) | 65 | 65 | 65 | 65 | 65 |
| Reaction Time (Hrs.) | 1 | 1 | 1 | 1 | 1 |
| Conversion of Reactants (percent) | 45.7 | 46.4 | 52.6 | 52.6 | 23.8 |
| Yield of $B_{10}H_{14}$ (percent) | 47.5 | 53.6 | 50.9 | 41.5 | 18.5 |
| Materials Out: | | | | | |
| $B_2H_6$, gm | 0.30 | 0.38 | .25 | 0.30 | 0.08 |
| $B_4H_{10}$, gm | 0.11 | 0.43 | .47 | 0.44 | 0.32 |
| $B_5H_9$, gm | 1.06 | 0.66 | .34 | 0.50 | 1.38 |
| $B_5H_{11}$, gm | trace | trace | trace | trace | trace |
| $B_{10}H_{14}$, gm | 0.47 | 0.50 | .46 | 0.42 | 0.10 |
| Solids and Losses | 0.22 | 0.56 | 0.19 | 0.27 | .35 |
| Maximum pressure (p.s.i.g.) | 2,050 | 2,750 | 2,050 | 1,750 | 1,950 |

Various modifications can be made in the procedures of the specific examples to provide other embodiments which fall within the scope of this invention. The pyrolysis reaction can be carried out at a temperature between 40° C. and 90° C., preferably at a temperature of 50° C. to 70° C. Also, the pressure can vary from 1500 p.s.i.g. or somewhat less to 3,500 p.s.i.g. or somewhat more. The time for the reaction can be varied considerably, generally from 0.5 to 5 hours and preferably from 0.5 to 1.5 hours. The co-pyrolysis of tetraborane and pentaborane (9) can be carried out as such, as shown by Examples II and VI, or while in admixture with an inert gas, such as nitrogen, argon or helium, as shown by the other examples.

The weight ratio of tetraborane to pentaborane (9) can be varied from 1:1 or somewhat less to 5:1, preferably 3:1. About 85 percent of the tetraborane is converted to decaborane and, approximately 90 percent of the pentaborane (9) is recovered when a ratio of tetraborane to pentaborane (9) of 3:1 is used (Experiments II and VI). The conversion of tetraborane to decaborane and the yield of decaborane are decreased when a tetraborane to pentaborane (9) ratio of 1:2.5 is used (Experiment VII). The conversion of tetraborane to decaborane is about 40 percent when tetraborane is pyrolyzed alone. When tetraborane is co-pyrolyzed with pentaborane (9), about 85 percent of the tetraborane is converted to decaborane.

It is claimed:

1. A method for the production of decaborane which comprises heating at a temperature within the range from 40° C. to 90° C. and at a pressure within the range from 1500 p.s.i.g. to 3500 p.s.i.g. a mixture consisting essentially of tetraborane and pentaborane (9), and recovering decaborane from the reaction mixture.

2. A method for the production of decaborane which comprises heating at a temperature within the range from 50° C. to 70° C. and at a pressure within the range from 1500 p.s.i.g. to 3500 p.s.i.g. a mixture consisting essentially of tetraborane and pentaborane (9) wherein the weight ratio of tetraborane to pentaborane (9) is within the range 1:1 to 5:1, and recovering decaborane from the reaction mixture.

References Cited in the file of this patent

Schecter: "Boron Hydrides and Related Compounds," pages 25–27, Jan. 8, 1951, declassified Jan. 5, 1954, Dept. of the Navy, Bureau of Aeronautics.

Stock: "Hydrides of Boron and Silicon," page 80, (1933), Cornell Univ. Press, Ithaca, N.Y.